United States Patent [19]

Yamauchi

[11] Patent Number: 4,661,794
[45] Date of Patent: Apr. 28, 1987

[54] MOUNTING STRUCTURE FOR RESISTORS USED FOR CONTROLLING THE RUNNING OF INDUSTRIAL VEHICLES

[75] Inventor: Yasuhisa Yamauchi, Kariya, Japan

[73] Assignee: Kabushiki Kaisha Toyoda Jidoshokki Seisakusho, Kariya, Japan

[21] Appl. No.: 888,730

[22] Filed: Jul. 22, 1986

[30] Foreign Application Priority Data

Jul. 26, 1985 [JP] Japan ............................ 60-115442[U]

[51] Int. Cl.$^4$ ................................................ H01C 1/01
[52] U.S. Cl. ..................................... 338/315; 180/65.8
[58] Field of Search ............... 338/315, 198, 334, 297; 180/65.8, 69.24

[56] References Cited

U.S. PATENT DOCUMENTS

| | | | |
|---|---|---|---|
| 3,351,148 | 11/1967 | Solomon | 180/65.8 X |
| 3,965,971 | 6/1976 | Roggenkamp | 180/65.8 X |
| 4,047,145 | 9/1977 | Schwehr | 338/198 X |
| 4,087,776 | 5/1978 | Donato | 338/198 |
| 4,123,740 | 10/1978 | Palmer et al. | 338/198 X |

Primary Examiner—C. L. Albritton
Attorney, Agent, or Firm—Brooks Haidt Haffner & Delahunty

[57] ABSTRACT

A mounting structure for resistors used for controlling the running of industrial vehicles, is disclosed. The apparatus is so constructed that a control panel of an L-shaped, said control panel being mounted to an inner wall surface of a frame cover which is mounted on a floor plate with a gap from said inner wall surface, said panel including a vertically extending section and a horizontally extending section; control means provided to said vertically extending section; resistor means provided to said horizontally extending section; and window opening means provided in said floor plate and said frame cover, whereby the heat generated from said resistors is prevented from being transmitted to the mounted section of the control units.

5 Claims, 7 Drawing Figures

MOUNTING STRUCTURE FOR RESISTORS USED FOR CONTROLLING THE RUNNING OF INDUSTRIAL VEHICLES

BACKGROUND OF THE INVENTION

This invention relates to a mounting structure for resistors in a resistor control device used in an industrial vehicles such as a low-lift truck, wherein the resistors are connected in a series circuit including an electric storage cell and a driving motor.

As one of the methods for controlling the running speed of industrial vehicles such as low-lift trucks, a plurality of resisters are commutatably connected to a series circuit including the storage cell and the driving motor, and the resistance value of the resisters is changed by a commutating operation initiated by an operating lever for controlling the running speed of the vehicle. However, in this type of resistor control device, in order to avoid a situation where the control equipment such as the contactors of the control units are affected by the heat generated in the resistors, these resistors are provided at a position some distance from the control equipment.

As far as the present inventors are aware, there has not been any publications disclosing the above described connectional mounting structure for resistors, but the structure so far used in such industrial vehicles produced by the present Applicant is shown by way of reference in FIGS. 1 to 3.

Referring to FIGS. 1 to 3, the numeral 1 designates a driving wheel, and the numeral 2 is a base block mounting on the driving wheel 1. On a floor 2a of the base block 2 and towards the rear thereof, there is mounted an upwardly directed handle lever 3 provided with a variety of operating switches and levers, not shown.

On the floor plate 2a and towards the front part thereof, there are mounted a driving unit and a hydraulic lift unit, not shown. These units are sheathed by a frame cover 4.

A battery compartment 5 is liftably connected to the forward extreme end of the base 2.

Left side and right side forks 7, 7 are extended from the forward part of the compartment 5. To the forward parts of these forks 7, 7, a pair of road wheels 8 are supported for rolling and to be vertically movable. The control panel 6 mounting the control equipment such as the contactors is mounted within the frame cover 4 sheathing the driving and hydraulic lift units, while the resistors 11 are attached to the underside of the floor plate 2a. Thus, an L-shaped bracket 15 is mounted upside down to the lower bottom of the floor plate 2a. To the bracket 15 is secured a plurality of, herein two, resistors 11 with an intermediary strip 16 of a heat insulating material mounted between the resistors and the floor plate 2a. The resistors 11 are sheathed as a whole by a cover 17.

The above described prior-art mounting structure gives rise to the following problems.

(a) When there are pools of water on the road surface, the water splashed by the driving wheels is apt to be scattered towards the resistors. In addition, dust flung up by the driving wheel is likely to be deposited on the resistors.

(b) Obstacles on the road surface are likely to strike and damage the resistors.

(c) For mounting the resistors to the lower bottom of the floor plate, special components such as brackets or covers are required with a corresponding rise in production costs.

(d) The operations of assembly, maintenance and inspection are both cumbersome and time-consuming. Especially, the vehicle body must be lifted by a hydraulic jack when performing maintenance or inspection.

SUMMARY OF THE INVENTION

It is a principal object of the present invention to provide a means effective to overcome the aforementioned problems of the prior-art system. To this effect, the present invention provides a construction comprising an L-shaped control panel, said control panel being mounted to an inner wall surface of a frame cover which is mounted on a floor plate with a gap from said inner wall surface, said panel including a vertically extending section and a horizontally extending section; control means provided to said vertically extending section; resistor means provided to said horizontally extending section; and window opening means provided in said floor plate and in said frame cover.

DESCRIPTION OF THE PREFERRED EMBODIMENT

A preferred embodiment of the present invention is hereinafter explained by referring to the accompanying illustrative drawings.

Figure 1:
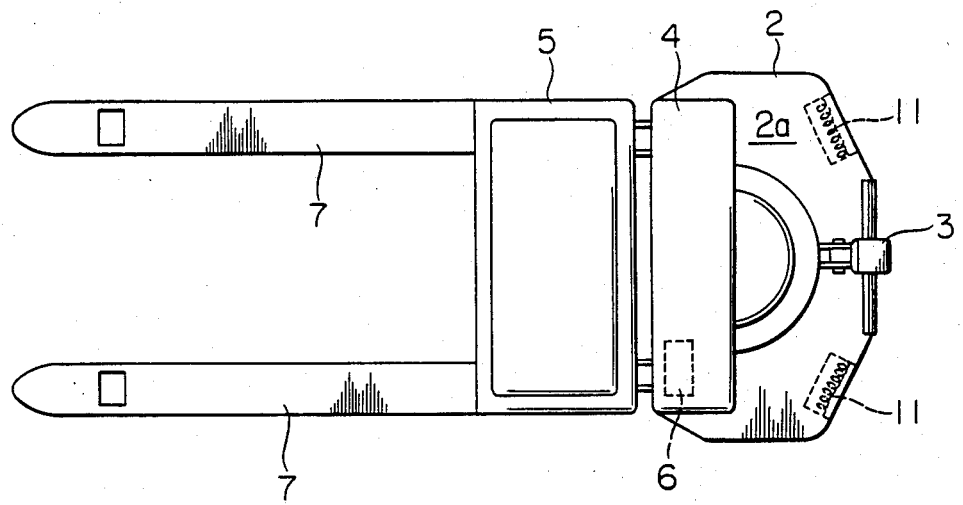
FIG. 1 is a plan view showing a low-lift truck provided with the conventional resistor control device.
Figure 2:
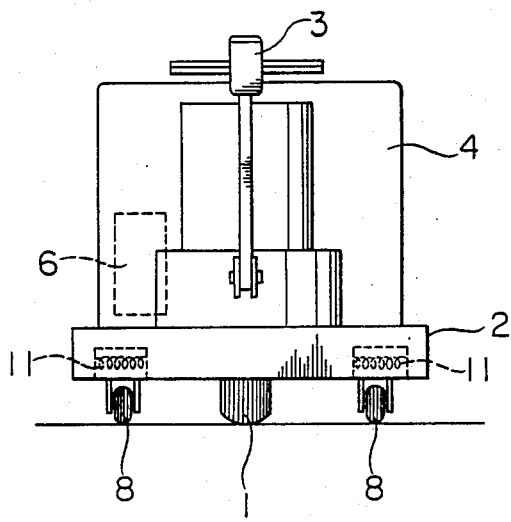
FIG. 2 is a back side view thereof.
Figure 3:
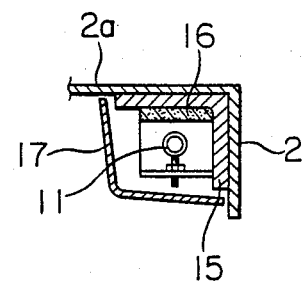
FIG. 3 is a sectional view showing the resistor mounting section.
Figure 4:
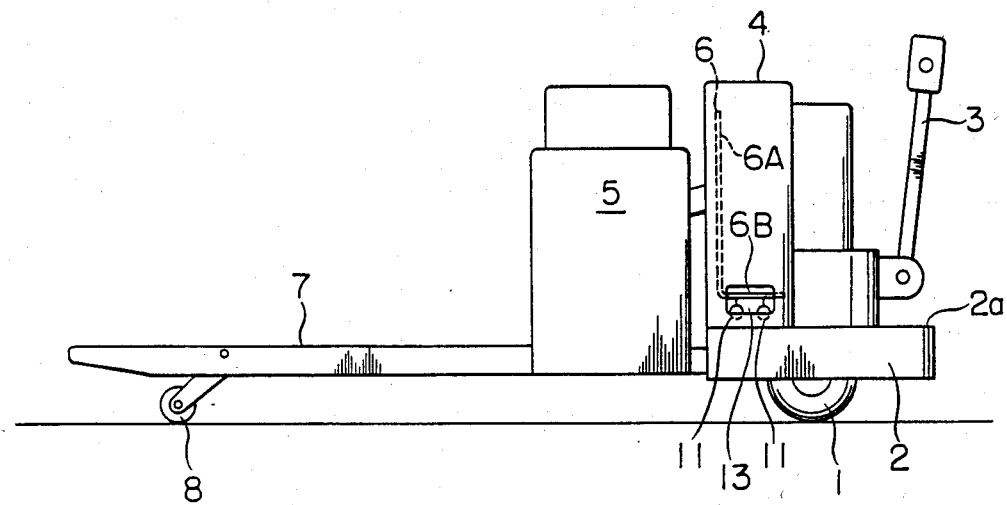
FIG. 4 is a side elevation showing the overall low-lift truck provided with the resistor control device of the present invention.
Figure 5:
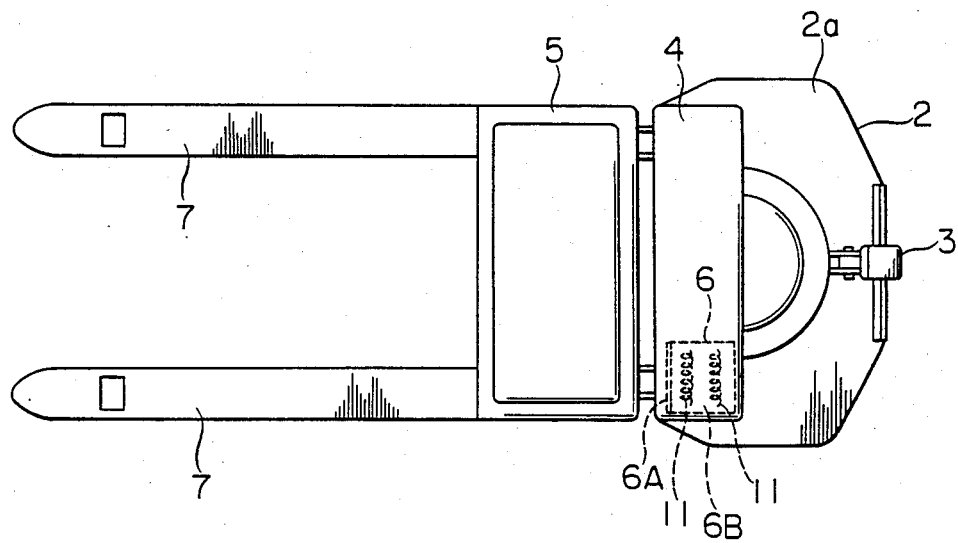
FIG. 5 is a plan view thereof.
Figure 6:
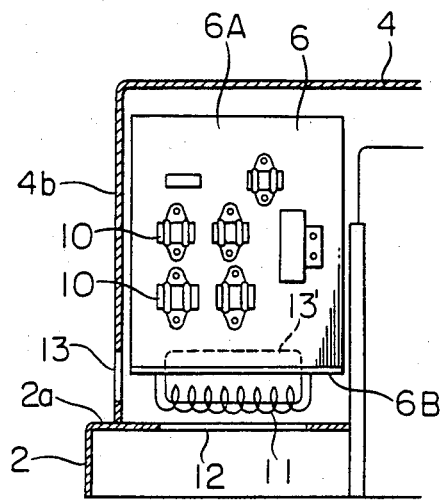
FIG. 6 is a sectional view of the mounting section for the resistor control device.
Figure 7:
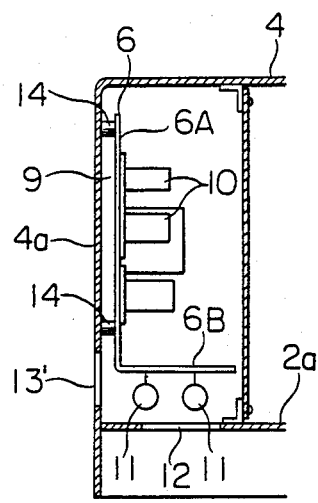
FIG. 7 is a sectional view of the mounting section for the resistor control device.

Referring to FIGS. 4 to 7, the numeral 1 designates a driving wheel, and the numeral 2 is a base block mounting on the driving wheel 1. On a floor plate 2a of the base block 2 and towards the rear thereof, there is mounted an upwardly directing handle lever 3 provided with a variety of operating switches and levers, not shown. On the floor plate 2a and toward the front part thereof, there are mounted a driving unit and a hydraulic lift unit, not shown. These units are sheathed by a frame cover 4. To the forward extreme end of the base block 2 a battery compartment or back rest 5 is connected to be vertically movable by operation of the aforementioned hydraulic lift unit. Left side and right side forks 7, 7 are extended from the forward part of the compartment 5. To the forward parts of these forks 7, 7, a pair of road wheels 8 are supported for rolling movement and to be vertically movable.

Within the frame cover 4 and toward one side thereof, there is mounted a control panel 6. The panel 6 is in the form of a vertically elongated letter L consisting of a vertically extending section 6A along the forward wall of the frame cover 4 and a horizontally extending section 6B bent at right angles at the lower end of the vertically extending section 6A and extending therefrom rearwards. The control panel 6 has the vertically extending section 6A thereof secured to the forward wall of the frame cover 4, as shown. More precisely the vertically extending section 6A is secured to the forward wall 4a of the frame cover 4 with the intermediary of mounting blocks or shims 14 therebetween such that a gap 9 is defined between the section 6A and the forward wall of the frame cover 4. Control units 10 are secured to the vertically extending section 6A while resistors 11 are secured to the horizontally extending section 6B for facing downwards.

A window opening 12 is formed facing the resistors 11, in the floor plate 2a of the base block 2 whereas window openings 13 and 13' are formed facing the resistors 11 in a side wall 4b and the forward wall 4a of the frame cover 4, respectively.

The device so far shown and described operates as follows:

Since the mounting portion of the control units 10 and the suspension points of the resistors 11 are separated from each other by the horizontally extending section 6B of the control panel 6, it is possible to prevent the heat generated from the resistors 11 from being transmitted to the mounting portion of the control unit 10.

In addition, by virtue of the provision of the gap 9 between the vertically extending section 6A of the control panel 6 and the forward wall 4a of the frame cover 4, the window opening 12 in the floor plate 2a of the base block 2 and the window openings 13 and 13' in the side wall 4b and the forward wall 4a of the frame cover 4, respectively, it is possible to permit the heat generated in the resistors 11 to escape out of the frame cover 4. Therefore it is possible to effectively prevent the rise in the temperature of the control units 10 by aforementioned construction.

In the above described construction of the present invention the control units and the resistors can be unitarily incorporated into the control panel without imparting the thermal effect of the resistors to the control units, so that the efficiency of mounting, maintenance and inspection operations can be significantly improved. The control units and the resistors can be unitarily incorporated into the control panel, so that the cable connection between the control units and the resistors can be reduced in length, while the bracket and the cover for the resistors can be eliminated with corresponding saving in the production costs.

In addition, in the above described construction of the present invention, the resistors can be attached to the base block with significantly improved operational reliability of the resistors. Thus the resistors can be safeguard against splashed water or similar inconveniences frequently occurred in the conventional mounting strucutre.

In sum, the following advantages are derived from the above described construction of the present invention.

(a) By virtue of the horizontally extending section, it becomes possible to separate the mounting section of the control units from the mounting section of the resistors, so that the heat generated at the resistor suspension points is prevented from being transmitted to the mounting section of the control units.

(b) By virtue of the window openings, it becomes possible for the heat produced at the resistor suspension points to escape from out of the frame cover, to thereby prevent a rise in temperature of the resistor suspension points.

(c) Due to the presence of the gap, it becomes possible to permit the heat generated in the resistor suspension points to be discharged while preventing the rise in temperature of the control panel.

What is claimed is:

1. A mounting structure for resistors used for controlling the running of industrial vehicles, said structure comprising:
   an L-shaped control panel, said control panel being mounted to an inner wall surface of a frame cover which is mounted on a floor plate with a gap from said inner wall surface, said panel including a vertically extending section and a horizontally extending section;
   control means provided on said vertically extending section;
   resistor means provided on said horizontally extending section; and
   window opening means provided in said floor plate and said frame cover.

2. A mounting structure as claimed in claim 1 wherein mounting blocks or shims are provided between said vertically extending section and the frame cover.

3. A mounting structure as claimed in claim 1 wherein the resistor means are suspended from said horizontally extending section.

4. A mounting structure as claimed in claim 2 wherein said resistor means are suspended from said horizontally extending section.

5. A mounting structure as claimed in claim 1 wherein the window opening means and the resistor means are arranged in a facing relation to each other.

* * * * *

UNITED STATES PATENT AND TRADEMARK OFFICE
CERTIFICATE OF CORRECTION

PATENT NO. : 4,661,794

DATED : April 28, 1987

INVENTOR(S) : Y. YAMAUCHI

It is certified that error appears in the above-identified patent and that said Letters Patent is hereby corrected as shown below:

Title page:

In the Abstract:

Line 3, after "apparatus", delete "is so constructed that a" and insert --comprises a substantially L-shaped--; delete last two words "of an".

Line 4, delete first word "L-shaped".

Line 9, delete first word "to" and insert --on--.

Line 10, after "vided", delete "to" and insert --beneath--.

In the Specification:

Column 1, line 14, change "resisters" to --resistors--; change "commutatably" to --commutatively--.

Column 2, line 14, after "mounted", delete "to" and insert --on--.

Column 2, line 18, after "provided", delete "to" and insert --on--.

Column 2, line 19, after "provided", delete "to" and insert --on--.

Column 3, line 34, after "by" and before "aforemen-", insert --the--.

UNITED STATES PATENT AND TRADEMARK OFFICE
CERTIFICATE OF CORRECTION

PATENT NO. : 4,661,794

DATED : April 28, 1987

INVENTOR(S) : Y. YAMAUCHI

It is certified that error appears in the above-identified patent and that said Letters Patent is hereby corrected as shown below:

Column 3, lines 37 and 38, after "be", delete "unitarily" and insert --integrally--.

Column 3, lines 42 and 43, after "be", delete "unitarily" and insert --integrally--.

Column 3, line 47, after "in", delete "the".

Column 4, line 1, change first word "safeguard" to --safeguarded--.

Column 4, line 15, after "escape" and before "from", insert --out--; after "from", delete "out of".

Column 4, line 20, after "preventing", and before "rise", change "the" to --a--.

Signed and Sealed this

Eighth Day of March, 1988

*Attest:*

DONALD J. QUIGG

*Attesting Officer*          *Commissioner of Patents and Trademarks*